United States Patent
Fu et al.

(10) Patent No.: US 12,526,736 B2
(45) Date of Patent: Jan. 13, 2026

(54) WIRELESS COMMUNICATION METHOD, TERMINAL APPARATUS, AND NETWORK APPARATUS

(71) Applicant: GUANGDONG OPPO MOBILE TELECOMMUNICATIONS CORP., LTD., Dongguan (CN)

(72) Inventors: Zhe Fu, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 300 days.

(21) Appl. No.: 17/863,627

(22) Filed: Jul. 13, 2022

(65) Prior Publication Data
US 2022/0346002 A1  Oct. 27, 2022

Related U.S. Application Data

(63) Continuation of application No. PCT/CN2020/071781, filed on Jan. 13, 2020.

(51) Int. Cl.
*H04W 48/20* (2009.01)
*H04W 48/18* (2009.01)
*H04W 76/30* (2018.01)
*H04W 84/04* (2009.01)

(52) U.S. Cl.
CPC ........... *H04W 48/20* (2013.01); *H04W 48/18* (2013.01); *H04W 76/30* (2018.02); *H04W 84/042* (2013.01)

(58) Field of Classification Search
CPC ..... H04W 76/30; H04W 48/18; H04W 48/20; H04W 84/042; H04W 76/27
See application file for complete search history.

(56) References Cited

U.S. PATENT DOCUMENTS

| 2018/0270713 A1 | 9/2018 | Park et al. |
| 2018/0317163 A1 | 11/2018 | Lee et al. |
| 2020/0120547 A1* | 4/2020 | Han ................. H04W 36/0083 |

(Continued)

FOREIGN PATENT DOCUMENTS

| CN | 106851589 A | 6/2017 |
| CN | 106879009 A | 6/2017 |

(Continued)

OTHER PUBLICATIONS

Notice of Allowance issued in corresponding European application No. 20913238.0, mailed Apr. 23, 2024.

(Continued)

*Primary Examiner* — Mandish K Randhawa
(74) *Attorney, Agent, or Firm* — BAYES PLLC

(57) ABSTRACT

Provided in embodiments of the present disclosure are a wireless communication method, a terminal apparatus, and a network apparatus. The method includes: performing, by a terminal device, cell selection or reselection according to slice information, or determining, by the terminal device, a target cell for the cell selection or reselection according to the slicing information. The slice information comprises at least one of: a slice identity, Network Slice Selection Assistance Information (NSSAI), a slice type or a service type, a cell identity, a cell identity range, a frequency point index, a Public Land Mobile Network (PLMN), and a Tracking Area (TA) identity.

7 Claims, 6 Drawing Sheets

(56) References Cited

U.S. PATENT DOCUMENTS

2021/0176697 A1\* 6/2021 Lu .................. H04W 88/06
2024/0259995 A1\* 8/2024 Hwang .............. H04W 76/27

FOREIGN PATENT DOCUMENTS

| CN | 106900023 | A | 6/2017 |
| CN | 106954235 | A | 7/2017 |
| CN | 107223350 | A | 9/2017 |
| CN | 108738096 | A | 11/2018 |
| CN | 109246775 | A | 1/2019 |
| CN | 110603855 | A | 12/2019 |
| CN | 111149387 | A | 5/2020 |
| EP | 3627863 | A1 | 3/2020 |
| WO | 2017118211 | A1 | 7/2017 |

OTHER PUBLICATIONS

Priority Review issued in corresponding Chinese application No. 202211436362.6, mailed Apr. 25, 2024.
First Office Action issued in corresponding Chinese application No. 202211436362.6, mailed May 16, 2024.
International Search Report from the International Searching Authority Re. PCT/CN2020/071781, mailed Sep. 24, 2020, 5 pages.
Written Opinion from the International Searching Authority Re. PCT/CN2020/071781, mailed Sep. 24, 2020, 11 pages.
"Corrections to TS 38.331 for RAN slicing", R2-2206172, Source: Huawei, HiSilicon (Rapporteur), 3GPP TSG-RAN WG2 Meeting #118-e, Electronic, May 9-20, 2022, 1198 pages.
"38.304 CR Corrections on slice-based cell reselection", R2-2206845, Source: NEC, 3GPP TSG-RAN WG2 Meeting #118e, Electronic meeting, May 9-20, 2022, 13 pages.
Extended European Search Report issued in corresponding European application No. 20913238.0, mailed Dec. 9, 2022.
Gemal To N.V., "Impacts of network slicing in RAN area", R2-1707758, 3GPP TSG-RAN2 #99 Berlin, Germany, Aug. 21-25, 2017.
Huawei et al., "Slice Availability for Cell (Re-)Selection", R2-1708927, 3GPP TSG-RAN WG2#99 Berlin, Germany, Aug. 21-25, 2017.
CATT, "Cell selection and re-selection based on slice", R2-1707893, 3GPP TSG-RAN WG2 #99 Berlin, Germany, Aug. 21-25, 2017.
First Office Action issued in corresponding European application No. 20913238.0, mailed Sep. 18, 2023.
Second Office Action issued in corresponding Chinese Application No. 202211436362.6, mailed on Nov. 14, 2024, 14 pages.
Decision of Rejection issued in corresponding Chinese Application No. 02211436362.6, dated Feb. 12, 2025, 10 pages.

\* cited by examiner

WIRELESS COMMUNICATION METHOD, TERMINAL APPARATUS, AND NETWORK APPARATUS

CROSS REFERENCE TO RELATED APPLICATION

The present application is a continuation of International Application No. PCT/CN2020/071781, filed on Jan. 13, 2020, the content of which is incorporated herein by reference in its entirety.

TECHNICAL FIELD

Embodiments of the present disclosure generally relate to the communication technical field, and more particularly, to a wireless communication method, a terminal device and a network device.

BACKGROUND

In a wireless communication system, a terminal device may perform an operation of cell selection or cell reselection. Currently, when the terminal device performs cell selection or cell reselection, the terminal device only selects the strongest cell on a frequency point.

However, the cell corresponding to the slicing service supported by the terminal device may not be the strongest cell on this frequency point, and thus the terminal device may not be able to select a suitable cell, thus causing the terminal device to continue to perform cell reselection, affecting the normal transmission of slicing service of the terminal device and thereby further affecting the performance of the terminal device.

SUMMARY

Embodiments of the present disclosure provide a wireless communication method, a terminal device and a network device. The terminal device performs cell selection or cell reselection based on slice information, so that the terminal device can quickly access the cell corresponding to the slicing service which the terminal device supports, ensuring instant and effective business services between the terminal device and the network device.

According to a first aspect, there is provided a wireless communication method, including:
performing, by a terminal device, cell selection or reselection according to slice information, or determining, by the terminal device, a target cell for the cell selection or reselection according to the slice information, wherein the slice information includes at least one of: a slice identity, Network Slice Selection Assistance Information (NSSAI), a slice type or a service type, a cell identity, a cell identity range, a frequency point index, a Public Land Mobile Network (PLMN), and a Tracking Area (TA) identity.

According to a second aspect, there is provided a wireless communication method, including:
sending, by a network device, first information to a terminal device, wherein the first information includes slice information, and the slice information is used for the terminal device to perform cell selection or reselection, or the slice information is used for the terminal device to determine a target cell for the cell selection or reselection, wherein the slice information includes at least one of: a slice identity, Network Slice Selection Assistance Information (NSSAI), a slice type or a service type, a cell identity, a cell identity range, a frequency point index, a Public Land Mobile Network (PLMN), and a Tracking Area (TA) identity.

According to a third aspect, there is provided a terminal device configured to perform the method according to the first aspect or implementations of the first aspect.

Specifically, the terminal device includes functional modules configured to perform the method according to the first aspect or implementations of the first aspect.

According to a fourth aspect, there is provided a network device configured to perform the method according to the second aspect or implementations of the second aspect.

Specifically, the network device includes functional modules configured to perform the method according to the second aspect or implementations of the second aspect.

According to a fifth aspect, there is provided a terminal device including a processor and a memory. The memory is configured to store a computer program, and the processor is configured to call and run the computer program stored in the memory to cause the processor to perform the method according to the first aspect or implementations of the first aspect.

According to a sixth aspect, there is provided a network device including a processor and a memory. The memory is configured to store a computer program, and the processor is configured to call and run the computer program stored in the memory to cause the processor to perform the method according to the second aspect or implementations of the second aspect.

According to a seventh aspect, there is provided an apparatus configured to implement the method according to any one of the first and second aspects or implementations of any one of the first and second aspects.

Specifically, the apparatus includes a processor which is configured to call and run a computer program from a memory to cause a device in which the apparatus is installed to perform the method according to any one of the first and second aspects or implementations of any one of the first and second aspects.

According to an eighth aspect, there is provided a computer-readable storage medium configured to store a computer program which causes a computer to perform the method according to any one of the first and second aspects or implementations of any one of the first and second aspects.

According to a ninth aspect, there is provided a computer program product including computer program instructions which cause a computer to perform the method according to any one of the first and second aspects or implementations of any one of the first and second aspects.

According to a tenth aspect, there is provided a computer program. When the computer program runs on a computer, the computer is caused to perform the method according to any one of the first and second aspects or implementations of any one of the first and second aspects.

In the above technical solutions, the terminal device performs cell selection or cell reselection based on slice information, so that the terminal device can quickly access the cell corresponding to the slicing service which the terminal device supports, ensuring instant and effective business services between the terminal device and the network device.

DETAILED DESCRIPTION

The technical solutions in embodiments of the present disclosure will be described below with reference to the drawings in the embodiments of the present disclosure. Obviously, the described embodiments are part of the embodiments of the present disclosure, but not all of the embodiments. All other embodiments obtained by those of ordinary skill in the art based on the embodiments of described herein without creative work fall within the scope of protection of the present disclosure.

Embodiments of the present disclosure can be applied to various communication systems, such as, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolution system of NR system, LTE-based access to unlicensed spectrum (LTE-U) system, NR-based access to unlicensed spectrum (NR-U) system, Universal Mobile Telecommunication System (UMTS), Wireless Local Area Networks (WLAN), Wireless Fidelity (WiFi), next-generation communication system or other communication systems, etc.

Generally speaking, traditional communication systems support a limited number of connections and are easy to implement. However, with the development of communication technologies, mobile communication systems will not only support traditional communications, but also support, for example, Device to Device (Device to Device, D2D) communications, Machine to Machine (M2M) communications, Machine Type Communication (MTC), and Vehicle to Vehicle (V2V) communications, etc. Embodiments of the present disclosure can be applied to these communications systems.

The communication systems in embodiments of the present disclosure can be applied to a Carrier Aggregation (CA) scenario, can also be applied to a Dual Connectivity (DC) scenario, and can also be applied to a standalone (SA) network deployment scenario.

The spectrum which embodiments of the present disclosure can be applied in is not limited. For example, embodiments of the present disclosure may be applied to licensed spectrum or unlicensed spectrum.

Figure 1:
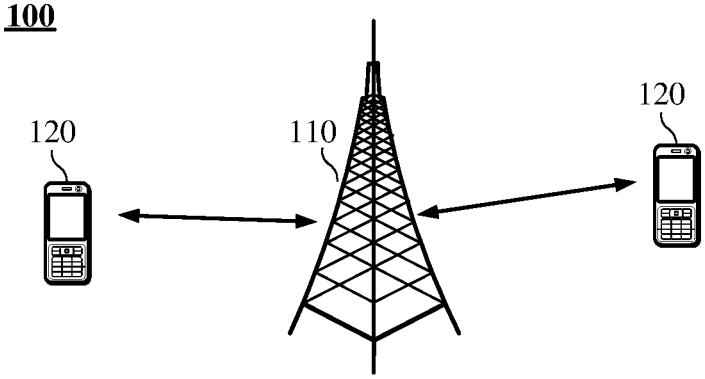
FIG. 1 is a schematic diagram of a communication system architecture according to an embodiment of the present disclosure.

Exemplarily, a communication system 100 to which embodiments of the present disclosure may be applied is shown in FIG. 1. The communication system 100 may include a network device 110. The network device 110 may be a device that communicates with a terminal device 120 (or referred to as a communication terminal, a terminal). The network device 110 may provide communication coverage for a particular geographic area and may communicate with terminal devices within the coverage area.

FIG. 1 exemplarily shows one network device and two terminal devices. According to some embodiments, the communication system 100 may include multiple network devices and the coverage of each network device may include other numbers of terminal devices, and embodiments of the present disclosure do not impose specific limitations on this.

According to some embodiments, the communication system 100 may further include other network entities such as a network controller, or a mobility management entity, which are not limited in embodiments of the present disclosure.

It should be understood that a device having a communication function in the network/system in embodiments of the present disclosure may be referred to as a communication device. Taking the communication system 100 shown in FIG. 1 as an example, the communication device may include a network device 110 and terminal devices 120 with a communication function, and the network device 110 and the terminal devices 120 may be the specific devices described above, which will not be repeated here. The communication device may further include other devices in the communication system 100, such as other network entities like a network controller or a mobility management entity, which are not limited in embodiments of the present disclosure.

It should be understood that the terms "system" and "network" are often used interchangeably herein. The term "and/or" herein is only an association relationship to describe associated objects, indicating that there can be three kinds of relationships, for example, A and/or B can mean three cases: A alone, B alone, and A and B together. In addition, the character "/" herein generally indicates that the related objects are an "or" relationship.

Embodiments of the present disclosure are described in combination with a terminal device and a network device. The terminal device may also be called User Equipment (UE), access terminal, user unit, user station, mobile station, mobile terminal, remote station, remote terminal, mobile device, user terminal, terminal, wireless communication device, user agent or user device, etc. The terminal device can be a station (ST) in a WLAN, a cellular phone, a cordless phone, a Session Initiation Protocol (SIP) phone, a Wireless Local Loop (WLL) station, or a Personal Digital Assistant (PDA) device, a handheld device with wireless communication capabilities, a computing device or other processing device connected to a wireless modem, a vehicle-mounted device, a wearable device, or a terminal device in a next-generation communication system, such as a terminal device in the NR network or a terminal device in a future evolved Public Land Mobile Network (PLMN) network.

By way of example and not limitation, in embodiments of the present disclosure, the terminal device may also be a wearable device. The wearable device can also be referred to as a wearable smart device, which is a general term for applying wearable technology to intelligently design everyday wear and develop wearable devices, such as glasses, gloves, watches, clothing and shoes. A wearable device is a portable device that is worn directly on the body or integrated into users' clothes or accessories. The wearable device is not only a hardware device, but also realize powerful functions through software support, data interaction, and cloud interaction. Generalized wearable smart devices include full-featured and large-sized devices which can realize complete or partial functions that do not depend on smart phones, such as smart watches or smart glasses, and devices that only focus on a certain type of application functions, and need to cooperate with other devices like smart phones, such as smart bracelets for sign monitoring, or smart jewelry.

The network device may be a device for communicating with a mobile device. The network device may be an Access Point (AP) in WLAN, a base station (BTS, Base Transceiver Station) in GSM or CDMA, or a base station (NB, NodeB) in WCDMA, an evolved base station in LTE (Evolutional Node B, eNB or eNodeB,), or a relay station or an access point, or a vehicle-mounted device, a wearable device, a network device or base station (gNB) in an NR network, or a network device in future evolved PLMN network.

In embodiments of the present disclosure, the network device provides services for a cell, and the terminal device communicates with the network device through transmission resources (for example, frequency domain resources, or spectrum resources) used by the cell. The cell may be a cell corresponding to the network device (for example, base station). The cell may belong to a macro base station or a base station corresponding to a small cell. The small cell here may include: a metro cell, a micro cell, a pico cell, a femto cell, etc. These small cells have the characteristics of small coverage and low transmit power, and are suitable for providing high-speed data transmission services.

It should be understood that the strong demand for wireless communication in the vertical market is obvious. In order to meet the vertical industry's requirements for delay, mobility, reliability, location accuracy, etc., the Radio Access Network (RAN) needs to be enhanced in the aspect of how to support vertical services in the access network. One way is to provide lower latency, more targeted, more flexible and more scalable services for multiple services with different requirements based on network slicing. More specifically, RAN slicing enables application providers to participate in the design, deployment, and operation of custom RANs to better support application providers' business. Therefore, Release 17 (Rel-17) introduces enhancements to slicing in the access network.

The slicing of Release 15 (Rel-15) only involves the core network side. Specifically, a terminal device reports a slicing requirement, and a network device selects an appropriate Access Management Function (AMF) according to the slicing requirement reported by the terminal device, to establish a service session between the terminal and the network. And, at this stage, the network slicing-related behaviors supported by the RAN are not involved.

In the current cell selection and cell reselection procedure, a Radio Resource Control (RRC) connection release message may carry redirection information, and the redirection information may include a redirected Radio Access Technology (RAT) and frequency point information. When the terminal device leaves the connected state, if the terminal device does not find a suitable cell according to the redirection information, the terminal device performs a cell selection procedure. In the cell selection procedure, if the terminal device has cell selection information stored thereon, the terminal device can search for a suitable cell on the stored frequency point(s). If the cell is found, the terminal device selects this cell to camp on.

If there is no suitable cell, the terminal device performs Initial Cell Selection procedure, that is, the terminal device scans all supported NR frequency bands, and for each frequency point, the terminal device only searches for the strongest cell on the frequency point. If the cell is found, the terminal device can select this cell to camp on; otherwise, the terminal device enters the state of Any Cell Selection.

In the Any Cell Selection state, the terminal device performs a cell selection procedure to find a suitable cell. If the terminal device does not find a suitable cell after searching all the frequency points of all the supported RATs, the terminal device can try to find an acceptable cell on any RAT to camp on. If the UE finds an acceptable cell, the terminal device enters the state of Camped on Any Cell; otherwise, the terminal device resides in the Any Cell Selection state.

After entering the Camped on Any Cell state, the terminal device can read the system information of the camped cell, perform cell reselection related measurements, and perform the Cell Reselection Evaluation Process. When the cell reselection condition evaluation condition is satisfied, the terminal device can perform cell reselection again. At the same time, the terminal device can regularly try to search for a suitable cell on all frequency points of all supported RATs.

Specifically, in the above cell selection procedure, the terminal device only searches for the strongest cell for each frequency point to find a suitable cell.

In the above cell reselection procedure, when a frequency point having a priority different from the priority of the current NR frequency point is reselected, the terminal device can select the strongest cell on the frequency point. When a frequency point having a priority same as the priority of the current NR frequency point is reselected, the terminal device can select the most suitable cell among at least one strongest cell on the frequency point. For example, the terminal device can select a cell with the largest number of beams greater than a threshold as the suitable cell.

If the cell where the terminal device camps on is a suitable cell, the terminal device can perform normal data transmission. However, if the cell where the terminal device camps on is an acceptable cell, only limited services (such as emergency calls, receiving earthquake and tsunami warnings, etc.) can be supported in this cell. The terminal device cannot perform normal service transmissions in an acceptable cell, which will affect the performance and experience of the terminal device.

That is, at this stage, during cell selection and cell reselection, the terminal device only selects the cell with the strongest signal on a certain frequency point. This may result in that the cell with the strongest signal is not the cell corresponding to the slicing service supported by the terminal device, causing the terminal device to continue to perform cell reselection, increasing the delay in access of the terminal device and business services. In order to support the terminal device to quickly access the cell corresponding to supported slicing, the cell selection and cell reselection technologies need to be enhanced.

In view of the above technical problems, an embodiment of the present disclosure proposes a solution for cell selection. The terminal device performs cell selection or cell reselection based on slice information, so that the terminal device can quickly access the cell corresponding to the slicing service which the terminal device supports, ensuring real-time and effective business services between the terminal device and the network device.

Figure 2:
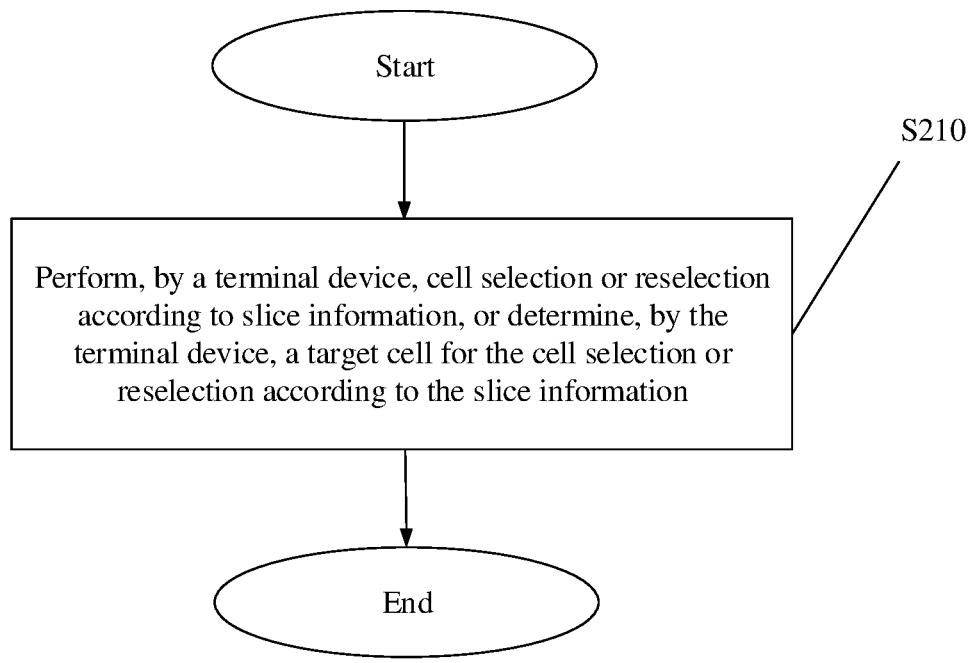
FIG. 2 is a schematic flowchart of a wireless communication method according to an embodiment of the present disclosure.

FIG. 2 is a schematic flowchart of a wireless communication method 200 according to an embodiment of the present disclosure. As shown in FIG. 2, the method 200 may include the following contents:

In S210, the terminal device performs cell selection or reselection according to slice information, or the terminal device determines a target cell for cell selection or reselection according to the slice information.

The slice information includes at least one of the following:
 a slice identity, Network Slice Selection Assistance Information (NSSAI), a slice type or a service type, a cell identity, a cell identity range, a frequency point index, a Public Land Mobile Network (PLMN), and a Tracking Area (TA) identity.

In the embodiment of the present disclosure, the terminal device performs cell selection or reselection based on the slice information, which ensures that the terminal device with a specific slicing service access demand can select or access a suitable cell based on a more suitable criterion to perform normal data transmissions, and thus avoids the delay of terminal device in cell access and slicing business services, and prevents terminal device from accessing a communication-restricted cell.

Optionally, in some embodiments of the present disclosure, the terminal device is a terminal device that supports slicing or specific slicing, or the terminal device is a terminal device that selects specific slice.

Optionally, in some embodiments of the present disclosure, the terminal device is in one of the following states:
 an initial cell selection state, a cell reselection state, an any cell selection state, and a camped on any cell state.

Optionally, in some embodiments of the present disclosure, the terminal device is in an idle state or an inactive state.

In some embodiments of the present disclosure, the terminal device may acquire the slice information in various ways. The following describes in detail how the terminal device obtains the slice information through five examples.

Example 1

The slice information is pre-configured or pre-stored information at the terminal device. For example, the slice information is information pre-configured at the terminal device by the network device. For another example, the slice information is information pre-stored at the terminal device by the network device.

Optionally, in Example 1, the slice information may specifically be information used for cell selection or reselection that is pre-configured or pre-stored at the terminal device.

Optionally, the slice information includes information corresponding to at least one of a slice, a cell, and a frequency point that the terminal device has historically accessed and/or has historically attempted to access.

That is to say, the slice identity included in the slice information may be information corresponding to the slice that the terminal device has accessed and/or attempted to access in the past, the cell identity and cell identity range included in the slice information may be information corresponding to the cell that the terminal device has accessed and/or attempted to access in the past, and the frequency point index included in the slice information may be information corresponding to the frequency point that the terminal device has accessed and/or attempted to access in the past.

Optionally, in Example 1, the above step S210 may specifically be:
 determining, by the terminal device, whether at least one cell or frequency point currently searched is the target cell according to the slice information.

Optionally, in Example 1, the above step S210 may specifically be:
 according to the slice information, determining, by the terminal device, that at least one cell or frequency point is a cell or frequency point corresponding to a slice supported or selected by the terminal device;
 searching, by the terminal device, the at least one cell or frequency point; and in response to that the terminal device finds a cell, determining, by the terminal device, the found cell as the target cell.

That is, in Example 1, the terminal device may obtain the slice information through information pre-configured or pre-stored at the terminal device.

Example 2

The terminal device may obtain the slice information through system information broadcast by the network device, and/or obtain a cell selection parameter specific to the slice.

According to some embodiments, the slice information and/or the slicing-specific cell selection parameter are carried in at least one of a Master Information Block (MIB), System Information Block (SIB) 1, SIB 2, SIB 3, SIB 4, and SIB 5 in the system information.

Specifically, in Example 2, the slice information and/or the slicing-specific cell selection parameter may be carried in at least one of the following in the system information:
 at least one Information Element (IE) in MIB, at least one IE in SIB 1, at least one IE in SIB 2, at least one IE in SIB 3, at least one IE in SIB 4, and at least one IE in SIB 5.

Optionally, in Example 2, the terminal device may perform one of the following operations according to the slicing-specific cell selection parameter:
 determining whether to camp on the target cell;
 determining whether to select the target cell to camp on; and
 determining whether the target cell is a suitable cell.

It should be noted that, the terminal device may also determine whether to perform cell reselection or whether to continue to perform the determination process or procedure of the target cell according to the slicing-specific cell selection parameter.

Optionally, in Example 2, the above step S210 may specifically be:
 according to ranking of a signal strength of at least one cell on a first frequency point, sequentially searching, by the terminal device, the at least one cell, wherein the first frequency point is one of at least one frequency point in a frequency band supported by the terminal device; and
 in response to that the terminal device finds a cell and the found cell is a cell corresponding to a slice supported or selected by the terminal device, determining, by the terminal device, the found cell as the target cell.

Optionally, in Example 2, the above step S210 may specifically be:

searching for a cell with the strongest signal on a first frequency point by the terminal device, wherein the first frequency point is one of at least one frequency point in a frequency band supported by the terminal device; and in response to that the terminal device finds the cell with the strongest signal and the cell with the strongest signal is a cell corresponding to a slice supported or selected by the terminal device, determining, by the terminal device, the cell with the strongest signal as the target cell.

Optionally, in Example 2, if the cell with the strongest signal on the first frequency point is not the target cell, the terminal device determines whether to perform cell search and/or cell selection on the first frequency point according to the cell identity included in the slice information and/or the slicing that is supported or selected by the terminal device.

Optionally, in Example 2, if the cell with the strongest signal on the first frequency is not the target cell, the terminal device determines whether to perform cell search and/or cell selection on an inter-frequency of the first frequency point according to slice information corresponding to the inter-frequency in the system information.

That is, in Example 2, the terminal device may obtain the slice information through system information broadcast by the network device.

Example 3

The terminal device receives dedicated RRC signaling sent by the network device. The dedicated RRC signaling includes the slice information.

Optionally, the dedicated RRC signaling further includes RRC release information.

Optionally, in Example 3, the above step S210 may specifically be:

in response to that the slice information includes only one frequency point, searching, by the terminal device, the one frequency point or a cell corresponding to the one frequency point; and in response to that the terminal device finds a cell, determining, by the terminal device, the found cell as the target cell.

Optionally, in Example 3, the above step S210 may specifically be:

in response to that the slice information includes a plurality of frequency points, searching, by the terminal device, the plurality of frequency points or cells corresponding to the plurality of frequency points; and in response to that the terminal device finds a cell, determining, by the terminal device, the found cell as the target cell.

Optionally, in Example 3, the above step S210 may specifically be:

in response to that the target cell is not determined according to the slice information, or that a suitable cell is not found on a frequency point included in the slice information, according to ranking of a signal strength of at least one cell on a first frequency point, sequentially searching, by the terminal device, the at least one cell, wherein the first frequency point is one of at least one frequency point in a frequency band supported by the terminal device; and in response to that the terminal device finds a cell and the found cell is a cell corresponding to a slice supported or selected by the terminal device, determining, by the terminal device, the found cell as the target cell.

That is, in Example 3, the terminal device may acquire the slice information through dedicated RRC signaling sent by the network device.

Example 4

The terminal device receives redirection information of the RRC release information sent by the network device. The redirection information includes the slice information.

Optionally, in Example 4, the above step S210 may specifically be:

in response to that the slice information includes only one frequency point, searching, by the terminal device, the one frequency point or a cell corresponding to the one frequency point; and in response to that the terminal device finds a cell, determining, by the terminal device, the found cell as the target cell.

Optionally, in Example 4, the above step S210 may specifically be:

in response to that the slice information includes a plurality of frequency points, searching, by the terminal device, the plurality of frequency points or cells corresponding to the plurality of frequency points; and in response to that the terminal device finds a cell, determining, by the terminal device, the found cell as the target cell.

Optionally, in Example 4, the above step S210 may specifically be:

in response to that the target cell is not determined according to the slice information, or that a suitable cell is not found on a frequency point included in the slice information, according to ranking of a signal strength of at least one cell on a first frequency point, sequentially searching, by the terminal device, the at least one cell, wherein the first frequency point is one of at least one frequency point in a frequency band supported by the terminal device; and in response to that the terminal device finds a cell and the found cell is a cell corresponding to a slice supported or selected by the terminal device, determining, by the terminal device, the found cell as the target cell.

That is, in Example 4, the terminal device may acquire the slice information through the redirection information of the RRC release information sent by the network device.

Example 5

The terminal device receives cell reselection priority information of the RRC release information sent by the network device. The cell reselection priority information includes the slice information.

Optionally, in Example 5, the foregoing step S210 may specifically be:

performing, by the terminal device, cell search according to priority information and the slice information in the cell reselection priority information; and in response to that the terminal device finds a cell, determining, by the terminal device, the found cell as the target cell.

Optionally, in Example 5, the above step S210 may specifically be:

determining, by the terminal device, the target cell for cell reselection according to the slice information in system information for a camped cell.

That is, in Example 5, the terminal device may acquire the slice information through the cell reselection priority information of the RRC release information sent by the network device.

Optionally, in some embodiments of the present disclosure, the terminal device may also receive the slicing-specific cell reselection parameter broadcast by the network device; and the terminal device performs cell reselection according to the cell reselection parameter corresponding to the slice information.

Optionally, the cell reselection parameter is carried in at least one of the following:

SIB 2, SIB 3, SIB 4, SIB 5, at least one IE in SIB 2, at least one IE in SIB 3, at least one IE in SIB 4, and at least one IE in SIB 5.

Therefore, in embodiments of the present disclosure, the terminal device performs cell selection or cell reselection based on the slice information, so that the terminal device can quickly access a cell corresponding to the slicing service that the terminal device supports, ensuring instant and effective business services between the terminal device and the network device.

Hereinafter, the technical solutions of the embodiments of the present disclosure will be described in detail with reference to three embodiments. It should be noted that, in order to describe the solutions, the following embodiments take a situation where the network device is a base station as an example for description, but the embodiments of the present disclosure are not limited to this.

In Embodiment 1, the terminal device is in an idle state, and the terminal device may obtain slice information according to system information. During cell selection and reselection, when selecting a suitable cell, the terminal device needs to consider whether the cell is a cell corresponding to slicing that the terminal device supports.

Specifically, in Embodiment 1, the base station broadcasts slice information 1 through system information. The slice information 1 includes but is not limited to at least one of the following:

a slice identity, NSSAI (such as, Single-Network Slice Selection Assistance Information, S-NSSAI), a slice type or a service type, a cell identity, a cell identity range, a frequency point index, a PLMN, a TA identity.

It should be noted that the cell identity included in the slice information 1 may be, for example, a Physical Cell Identifier (PCI), or the cell identity range included in the slice information may be a PCI range.

Optionally, the slice information 1 may be carried in at least one of MIB, SIB 1, SIB 2, SIB 3, SIB 4, and SIB 5 in the system information.

Specifically, the slice information 1 may be carried in at least one of the following information in system information:

at least one IE in MIB, at least one IE in SIB 1, at least one IE in SIB 2, at least one IE in SIB 3, at least one IE in SIB 4, and at least one IE in SIB 5.

It should be noted that the slice information 1 may further include information corresponding to the current cell or serving cell, and may also include information corresponding to a neighbor cell.

Optionally, in Embodiment 1, when a specific slice is congested or is about to be congested, the base station can use a cell reserved for other users (cellReservedForOtherUse) to remove or bar one or more specific UEs, such as setting cellReservedForOtherUse as true. The specific UEs may be, for example, Rel-15 UEs, Rel-16 UEs.

In Embodiment 1, a terminal device, or a terminal device that supports slicing, or a terminal device that supports specific slicing, or a terminal device that selects candidate slicing, performs cell selection and reselection.

In an implementation, if the terminal device has the saved slice information 2 for cell selection, the terminal device first searches for a suitable cell on the frequency point saved by the terminal device.

The slice information 2 may be information of a cell that the terminal device has accessed in the past and/or tried to access in the past, and the slice information 2 may include at least one of the following: a frequency point identity, a cell identity (such as PCI), PLMN, a slice identity, NSSAI (such as S-NSSAI), and a slice/service type. The PCI identifier may also be a PCI index.

Exemplarily, if the PCI value is continuous, the slice information 2 may include a PCI range, and may also be each PCI identifier; if the PCI value is discontinuous, the slice information 2 may include each PCI identifier.

Optionally, the terminal device may obtain the identity of at least one cell and/or the identity of at least one frequency point corresponding to the slice supported or selected by the terminal device according to the slice information 2.

Specifically, after the terminal device acquires the identity of at least one cell and/or the identity of the frequency point, the terminal device may determine the target cell according to the identity of the at least one cell and/or the identity of the frequency point (for convenience of description, in Embodiment In 1, the target cell is referred to as the target cell 1).

The terminal device may search at least one cell and/or at least one frequency point. If the terminal device finds a cell, the terminal device can determine the found cell as the target cell 1.

If there are multiple found cells, as an example, the terminal device may randomly select a cell as the target cell 1 among the found cells.

As another example, the terminal device may determine the cell with the strongest signal strength among the found cells as the target cell 1.

Optionally, the terminal device may determine the signal strength of the cell according to Reference Signal Received Power (RSRP) and/or Reference Signal Receiving Quality (RSRQ).

As another example, the terminal device may determine the first found cell as the target cell 1.

As another example, the terminal device may determine a cell with the number of beams greater than a threshold value among the found cells as the target cell 1. The threshold may be preset on the terminal device based on a standard, or preconfigured by the network device for the terminal device, for example, the threshold may be configured through RRC signaling.

In another implementation, if the terminal device does not save the slice information 2 for cell selection, the terminal device performs initial cell selection according to the slice information 1.

Optionally, as an example a, for each frequency point (such as a first frequency point) in at least one frequency point of the frequency band supported by the terminal device:

according to ranking of the signal strength of the at least one cell on the first frequency point, the terminal device may sequentially search the at least one cell; and if the terminal device finds a cell, and the found cell is a cell corresponding to a slice supported or selected by the terminal device, the terminal device determines the found cell as the target cell 1.

Specifically, in example a, the terminal device first searches for the cell with the strongest signal on the first frequency point. If the cell with the strongest signal is found, the slice information of the cell is obtained by reading the system information of the cell with the strongest signal. If the cell with the strongest signal is the cell corresponding to the slice supported or selected by the terminal device, the terminal device determines the cell with the strongest signal as the target cell 1.

Otherwise, the terminal device continues to search for the cell with the second strongest signal on the first frequency point, which is similar to the searching for the cell with the strongest signal. Other cells on the first frequency point may be searched, and so on.

Otherwise, the terminal device searches a next frequency point of the first frequency point, and so on.

Optionally, as an example b, for each frequency point (such as the first frequency point) in at least one frequency point of the frequency band supported by the terminal device:

the terminal device searches for a cell with the strongest signal on the first frequency point, wherein the first frequency point is one of at least one frequency point of a frequency band supported by the terminal device;

if the terminal device finds the cell with the strongest signal, and the cell with the strongest signal is the cell corresponding to the slice supported or selected by the terminal device, the terminal device determines the cell with the strongest signal as the target cell.

Specifically, in example b:

Optionally, the terminal device searches for a cell with the strongest signal on the first frequency point. If the cell with the strongest signal is found, the slice information of the cell is obtained by reading the system information of the cell with the strongest signal. If the cell with the strongest signal is the cell corresponding to the slice supported or selected by the terminal device, the terminal device determines the cell with the strongest signal as the target cell 1.

Otherwise, the terminal device searches for the cell with the strongest signal on a next frequency point of the first frequency point, and so on.

Optionally, in the above example a and/or example b, if the cell with the strongest signal on the first frequency point is not the target cell, the terminal device determines whether to perform cell search and/or cell selection on the first frequency point according to the cell identity in the slice information 1 and/or the slice supported or selected by the terminal device.

Optionally, in the above example a and/or example b, if the cell with the strongest signal on the first frequency point is not the target cell, the terminal device determines whether to perform cell search and/or cell selection on an inter-frequency of the first frequency point according to the slice information 1 corresponding to the inter-frequency in the system information (for example, SIB 4).

Figure 3:
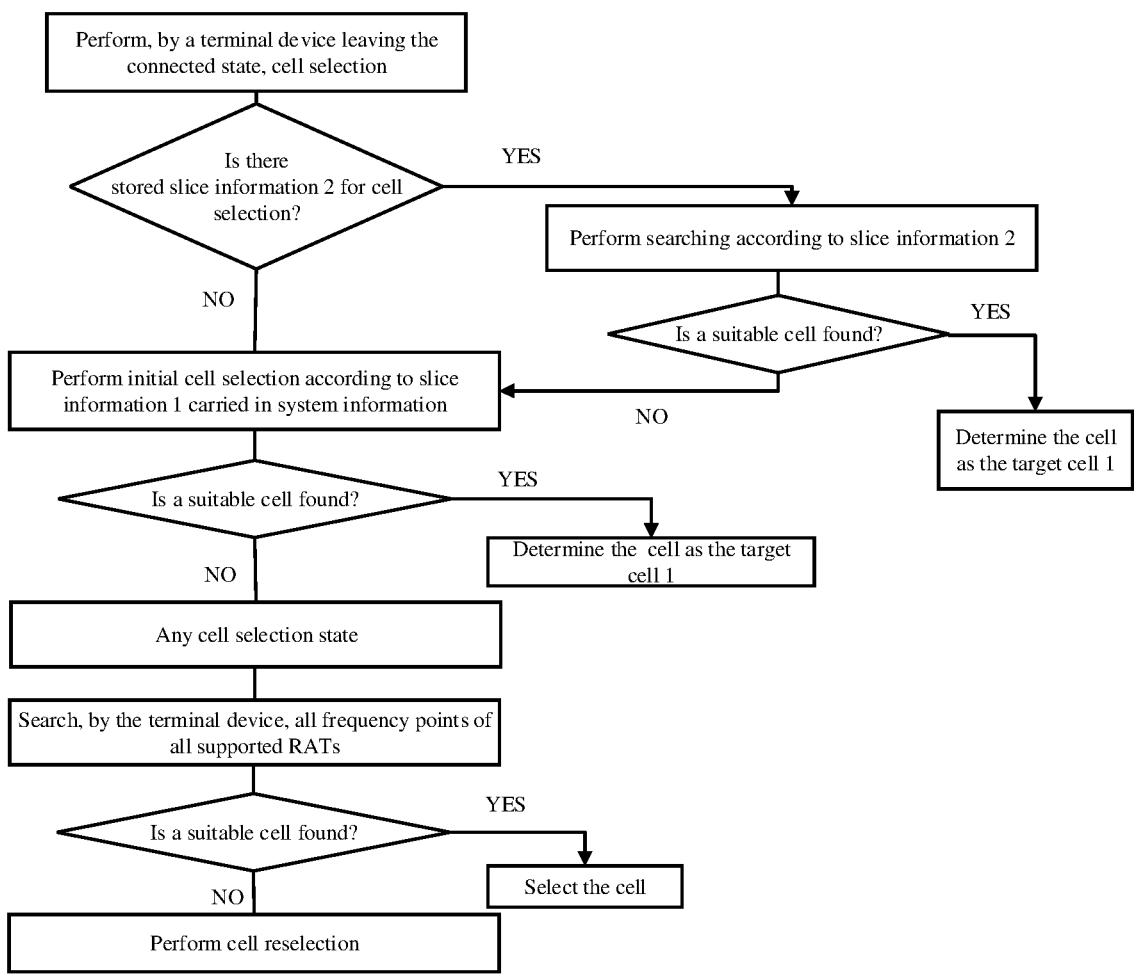
FIG. 3 is a schematic flowchart of cell selection or reselection according to an embodiment of the present disclosure.

Specifically, in Embodiment 1, the terminal device may perform cell selection and reselection through the procedure shown in FIG. 3.

After the terminal device leaves the connected state, cell selection is performed. In step 1, if the terminal device has the stored slice information 2 for cell selection, the terminal device first searches the stored cells and/or frequency points according to the slice information 2. If the terminal device can find a suitable cell, the terminal device can determine the found cell as the target cell 1. For a specific implementation of step 1, reference may be made to the description regarding Embodiment 1 above.

In the case that the terminal device has not determined the target cell 1, the terminal device performs step 2, that is, the initial cell selection procedure. Specifically, the terminal device may scan all supported NR frequency bands. Then, for each frequency point, the terminal device performs the initial cell selection procedure according to the slice information 1 broadcast by the system information. If the terminal device can find a suitable cell, the terminal device can determine the found cell as the target cell 1. For the specific implementation of step 2, reference may be made to the related descriptions of example a and example b in Embodiment 1.

If the terminal device does not determine the target cell 1, the terminal device performs step 3. That is, the terminal device enters the Any Cell Selection state. In the Any Cell Selection state, the terminal device performs a cell selection procedure to find a suitable cell.

In step 3, the cell selection procedure performed by the terminal device may be an existing cell selection procedure. For example, the terminal device searches on all frequency points of all supported RATs. If the terminal device finds a suitable cell, the terminal device can select the cell as the target cell. If the terminal device does not find a suitable cell after searching on all the frequency points of all the RATs of the supported RATs, the terminal device can find an acceptable cell on any RAT to camp on.

Alternatively, the terminal device may search for a suitable cell in the manner of step 2.

If the terminal device does not find a suitable cell, that is, the target cell is not determined, the terminal device enters the Camp on any cell state. In this state, the terminal device can perform a cell reselection procedure.

Specifically, the terminal device can read the system information of the currently camped cell, and perform cell reselection related measurements and cell reselection evaluation process. When the cell reselection rule is satisfied, the terminal device performs cell reselection again.

It should be understood that the embodiments of the present disclosure may perform cell reselection related measurements and cell reselection condition evaluation process according to any existing technology, which are not limited in the embodiments of the present disclosure.

In the specific process, similarly, a cell corresponding to the slice supported or selected by the terminal device may be selected as the target cell 1 for reselection.

Optionally, the terminal device regularly attempts to search on all frequency points of all supported RATs to find a suitable cell corresponding to the slice supported or selected by the terminal device.

Since it is conditional for the terminal device to perform cell reselection, the terminal device can perform cell reselection only when a condition is met. Thus, the terminal device may miss the opportunity to select a suitable cell. In addition, even if the terminal device selects a suitable cell, the terminal device may be constantly moving, and the terminal device may enter a unsuitable cell during the movement. Therefore, further, the terminal device can also regularly, search all the frequency points of the supported RATs for example to find a suitable cell corresponding to slice supported or selected by the terminal device, that is, determine the target cell.

Figure 4:
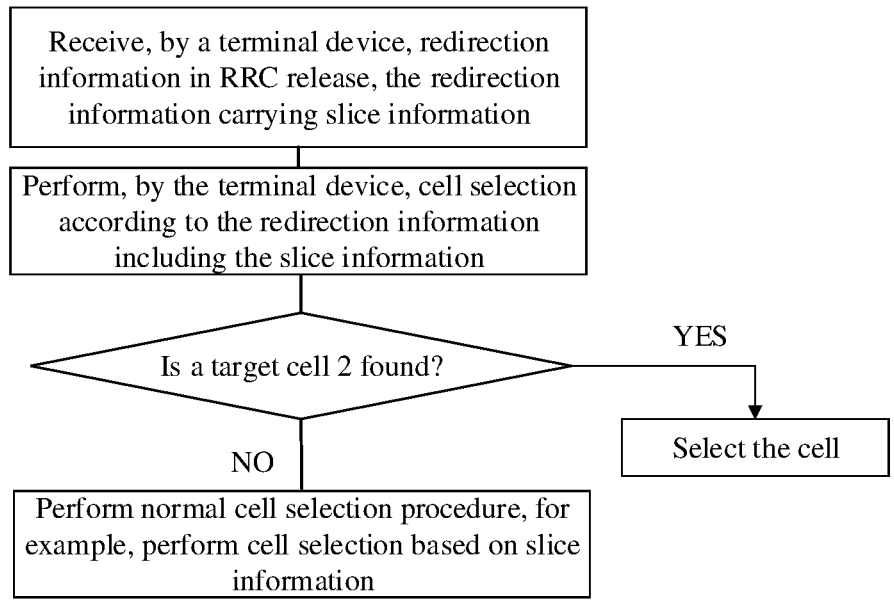
FIG. 4 is a schematic flowchart of another cell selection or reselection according to an embodiment of the present disclosure.

In Embodiment 2, the terminal device is in an idle state, and the redirection procedure is enhanced. RRC dedicated signaling, such as redirection information, carries slice information, specifically as shown in FIG. 4.

In Embodiment 2, the terminal device may receive redirection information during the redirection procedure, and the redirection information includes slice information.

Optionally, the slice information includes but is not limited to at least one of the following:

a slice identity, NSSAI (such as Single-Network Slice Selection Assistance Information (S-NSSAI)), a slice type or a service type, a cell identity (e.g., PCI), a cell identity range, a frequency point index, a PLMN, and a TA identity.

In Embodiment 2, the slice information may include an identity of one frequency point, or may include identities of multiple frequency points.

Optionally, the redirection information may be carried in dedicated RRC signaling. For example, the RRC connection release message carries redirection information.

Optionally, in Embodiment 2, the terminal device determines a target cell for cell selection or reselection according to slice information (for convenience of description, the target cell is referred to as target cell 2 in Embodiment 2).

Optionally, if the slice information only includes one frequency point, the terminal device searches the one frequency point or the cell corresponding to the one frequency point; if the terminal device finds a cell, the terminal device determines the found cell the target cell 2.

Optionally, if the slice information includes multiple frequency points, the terminal device searches the multiple frequency points or cells corresponding to the multiple frequency points; if the terminal device finds a cell, the terminal device determines the found cell as the target cell 2.

Specifically, in Embodiment 2, if the terminal device does not determine the target cell 2, or a suitable cell is not found on the frequency point(s) included in the slice information, the terminal device may perform the cell selection procedure in the above-described Embodiment 1.

For example, if the target cell 2 is not determined according to the slice information, or a suitable cell is not found on the frequency point(s) included in the slice information, for each frequency point (for example, the first frequency point) in at least one frequency point of the frequency band supported by the terminal device:

according to ranking of the signal strength of at least one cell on the first frequency point, the terminal device sequentially searches the at least one cell; if the terminal device finds a cell and the found cell corresponds to slice supported or selected by the terminal device, the terminal device determines the found cell as the target cell 2.

Specifically, in Embodiment 2, if the terminal device does not determine the target cell 2, the terminal device may also perform a normal cell selection procedure, as shown in FIG. 4. For example, if the terminal device has stored information, the terminal device may determine the target cell 2 on the stored cell and/or frequency point. If the target cell 2 is not found, the terminal device performs the initial cell selection procedure. If the target cell 2 is still not found, the terminal device enters the any cell selection state. If the target cell 2 is still not found, the terminal device enters the camped on any selection state, and then the terminal device performs a cell reselection procedure.

Figure 5:
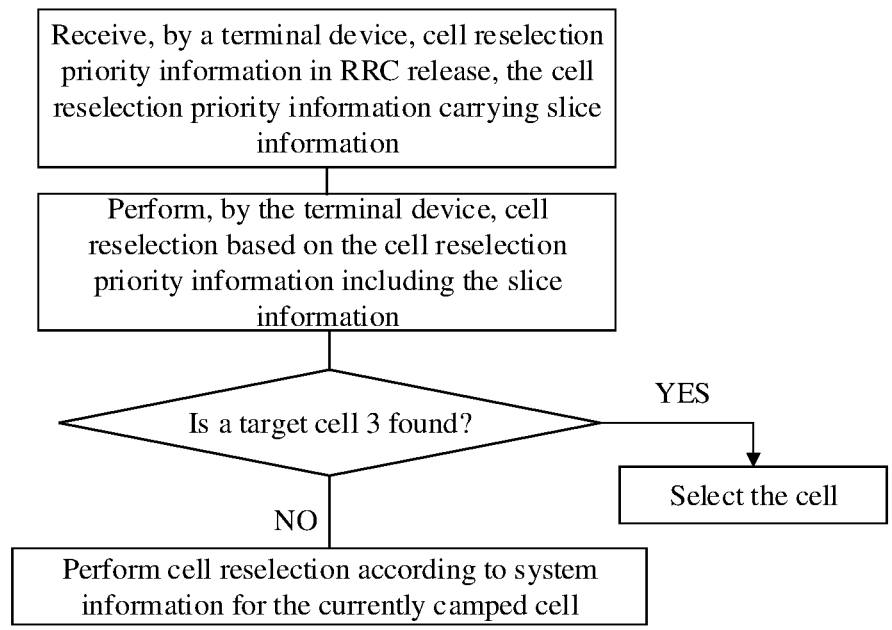
FIG. 5 is a schematic flowchart of still another cell selection or reselection according to an embodiment of the present disclosure.

In Embodiment 3, the terminal device is in an idle state, and the cell reselection priority information in the RRC release is enhanced, which carries the priority of the slicing frequency point in the cell reselection and/or the identity of the cell corresponding to the slicing, specifically, as shown in FIG. 5.

In Embodiment 3, the terminal device receives cell reselection priority information, where the cell reselection priority information includes slice information.

Optionally, the slice information includes but is not limited to at least one of the following:

a slice identity, NSSAI (such as Single-Network Slice Selection Assistance Information, S-NSSAI), a slice type or a service type, a cell identity (e.g., PCI), a cell identity range, a frequency point index, a PLMN, and a TA identity.

Optionally, the cell reselection priority information may be carried in dedicated RRC signaling. For example, the RRC connection release message may carry cell reselection priority information. For example, each NR frequency point priority IE in the NR frequency point priority list (FreqPriorityListNR) may carry the slice information.

Optionally, in Embodiment 3, the terminal device determines a target cell for cell selection or reselection according to slice information (for convenience of description, the target cell is referred to as target cell 3 in Embodiment 3).

Optionally, the terminal device performs a cell search according to the priority information and the slice information in the cell reselection priority information; if the terminal device finds a cell and the found cell satisfies the cell reselection rule, the terminal device determines the found cell as the target cell 3.

Specifically, the terminal device performs cell search according to the priority information and the slice information in the cell reselection priority information; if the terminal device searches for a cell, the terminal device determines the searched cell as the target cell 3.

Optionally, the terminal device determines the target cell 3 for cell reselection according to the slice information in the system information of the camped cell.

If the terminal device does not determine the target cell 3, the terminal device can perform cell reselection according to the system information of the currently camped cell. During the reselection procedure, the reselection can be performed according to an existing rule, or the reselection can be performed according to the cell reselection method in Embodiment 1.

It should be understood that although Embodiment 1 to Embodiment 3 are described above, this does not mean that Embodiment 1 to Embodiment 3 are independent, and the descriptions of embodiments may refer to each other. For example, the relevant description in Embodiment 1 can be applied to Embodiment 2 and Embodiment 3.

It should also be understood that some of the contents in Embodiment 1 to Embodiment 3 can be combined with each other.

In the above-mentioned Embodiment 1 to Embodiment 3, the terminal device performs cell selection and/or retransmission based on the supported slice information, which ensures that the terminal device with a specific slice service access demand can select a suitable cell based on a more appropriate criterion to perform normal data transmission, and avoids the delay in terminal device access and business services, and prevents the terminal device from entering a communication-restricted cell.

The wireless communication method according to embodiments of the present disclosure is described in detail from the perspective of the terminal device with reference to FIGS. 2 to 5. The wireless communication method according to another embodiment of the present disclosure is described in detail below with reference to FIG. 6 from the perspective of the network device. It should be understood that the description on the terminal device side corresponds to the description on the network device side, and similar descriptions can be referred to above, which are not repeated here to avoid repetition.

Figure 6:
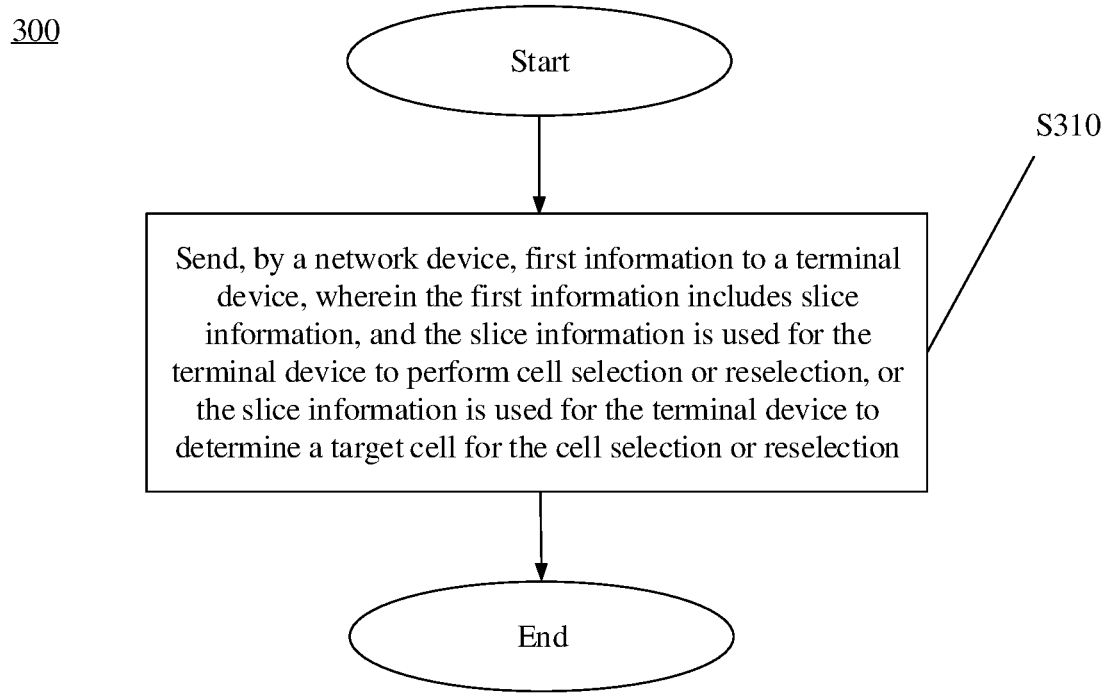
FIG. 6 is a schematic flowchart of another wireless communication method according to an embodiment of the present disclosure.

FIG. 6 is a schematic flowchart of a wireless communication method 300 according to an embodiment of the present disclosure. As shown in FIG. 6, the method 300 may include the following contents:

In S310, the network device sends first information to the terminal device. The first information includes slice information, and the slice information is used by the terminal device to perform cell selection or reselection, or the slice information is used by the terminal device to determine a target cell for cell selection or reselection.

The slice information includes at least one of the following:

a slice identity, NSSAI, a slice type or a service type, a cell identity, a cell identity range, a frequency point index, a PLMN, and a TA identity.

Optionally, as Embodiment 1, the network device sends the first information to the terminal device by broadcasting, where the first information is system information.

Optionally, in Embodiment 1, the slice information is carried in at least one of MIB, SIB 1, SIB 2, SIB 3, SIB 4, and SIB 5 in the system information.

Specifically, the slice information may be carried in at least one of the following in system information:

at least one IE in MIB, at least one IE in SIB 1, at least one IE in SIB 2, at least one IE in SIB 3, at least one IE in SIB 4, and at least one IE in SIB 5.

Optionally, as Embodiment 2, the first information is dedicated Radio Resource Control (RRC) signaling.

Optionally, the first information further includes RRC release information.

Optionally, as Embodiment 3, the first information is redirection information of the RRC release information.

Optionally, as Embodiment 4, the first information is cell reselection priority information of the RRC release information.

Optionally, in some embodiments, the network device may also send a slicing-specific cell reselection parameter to the terminal device in a broadcast manner, where the cell reselection parameter is used by the terminal device to perform cell reselection according to the cell reselection parameter corresponding to the slice information.

Optionally, the cell reselection parameter is carried in at least one of the following:

SIB 2, SIB 3, SIB 4, SIB 5, at least one IE in SIB 2, at least one IE in SIB 3, at least one IE in SIB 4, and at least one IE in SIB 5.

Optionally, in some embodiment of the present disclosure, the terminal device is a terminal device that supports slicing or specific slicing, or the terminal device is a terminal device that selects specific slicing.

Optionally, in some embodiments of the present disclosure, the terminal device is in one of the following states:

an initial cell selection state, a cell reselection state, an any cell selection state, a camped on any cell state.

Optionally, in some embodiments of the present disclosure, the terminal device is in an idle state or an inactive state.

Therefore, in the embodiments of the present disclosure, the network device configures slice information for the terminal device, and thus the terminal device can perform cell selection or cell reselection based on the slice information, and accordingly the terminal device can quickly access the cell corresponding to the slicing service that the terminal device supports, ensuring real-time and effective business services between the terminal device and the network device.

The method embodiments of the present disclosure are described in detail above with reference to FIGS. 2 to 6. The device embodiments of the present disclosure will be described in detail below with reference to FIGS. 7 to 11. It should be understood that the device embodiments and the method embodiments correspond to each other, and for similar descriptions, reference can be made to the method embodiments.

Figure 7:
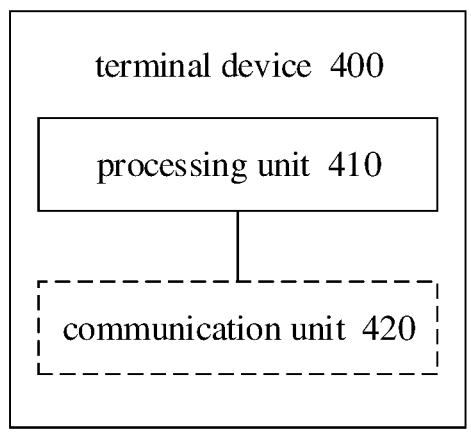
FIG. 7 is a schematic block diagram of a terminal device according to an embodiment of the present disclosure.

FIG. 7 is a schematic block diagram of a terminal device 400 according to an embodiment of the present disclosure. As shown in FIG. 7, the terminal device 400 includes a processing unit 410.

The processing unit 410 is configured to:

perform cell selection or reselection according to slice information, or determine a target cell for the cell selection or reselection according to the slice information, wherein the slice information includes at least one of:

a slice identity, Network Slice Selection Assistance Information (NSSAI), a slice type or a service type, a cell identity, a cell identity range, a frequency point index, a Public Land Mobile Network (PLMN), and a Tracking Area (TA) identity.

Optionally, the slice information is pre-configured or pre-stored information at the terminal device.

Optionally, the slice information is information used for cell selection or reselection that is pre-configured or pre-stored at the terminal device.

Optionally, the slice information includes information corresponding to at least one of a slice, a cell, and a frequency point that the terminal device has historically accessed and/or has historically attempted to access.

Optionally, the processing unit 410 is configured to:

determine whether at least one cell or frequency point currently searched is the target cell according to the slice information.

Optionally, the processing unit 410 is configured to:

according to the slice information, determine that at least one cell or frequency point is a cell or frequency point corresponding to slice supported or selected by the terminal device;

search the at least one cell or frequency point; and in response to that a cell is found, determine the found cell as the target cell.

Optionally, the terminal device 400 further includes a communication unit 420 configured to obtain the slice information and/or obtain a slicing-specific cell selection parameter via system information broadcast by a network device.

Optionally, the slice information and/or the slicing-specific cell selection parameter are carried in at least one of a Master Information Block (MIB), System Information Block (SIB) 1, SIB 2, SIB 3, SIB 4, and SIB 5 in the system information.

Optionally, the processing unit 410 is configured to:

according to ranking of a signal strength of at least one cell on a first frequency point, sequentially search the at least one cell, wherein the first frequency point is one of at least one frequency point in a frequency band supported by the terminal device; and in response to that a cell is found and the found cell is a cell corresponding to slice supported or selected by the terminal device, determine the found cell as the target cell.

Optionally, the processing unit 410 is configured to:

search for a cell with the strongest signal on a first frequency point, wherein the first frequency point is one of at least one frequency point in a frequency band supported by the terminal device; and in response to that the cell with the strongest signal is found and the cell with the strongest signal is a cell corresponding to slice supported or selected by the terminal device, determine the cell with the strongest signal as the target cell.

Optionally, the processing unit 410 is further configured to:

in response to that the cell with the strongest signal on the first frequency point is not the target cell, determine whether to perform cell search and/or cell selection on the first frequency point according to the cell identity in the slice information and/or the slice supported or selected by the terminal device.

Optionally, the processing unit 410 is further configured to:

in response to that the cell with the strongest signal on the first frequency is not the target cell, determine whether to perform cell search and/or cell selection on an inter-frequency of the first frequency point according to slice information corresponding to the inter-frequency in the system information.

Optionally, the processing unit 410 is further configured to:

perform one of the following operations according to the slicing-specific cell selection parameter:
determining whether to camp on the target cell;
determining whether to select the target cell to camp on; and
determining whether the target cell is a suitable cell.

Optionally, the terminal device 400 further includes a communication unit 420 configured to receive dedicated Radio Resource Control (RRC) signaling sent by a network device, wherein the dedicated RRC signaling includes the slice information.

Optionally, the dedicated RRC signaling further includes RRC release information.

Optionally, the terminal device 400 further includes a communication unit 420 configured to receive redirection information of RRC release information sent by a network device, wherein the redirection information includes the slice information.

Optionally, the processing unit 410 is configured to:
in response to that the slice information includes only one frequency point, search the one frequency point or a cell corresponding to the one frequency point; and
in response to that a cell is found, determine the found cell as the target cell.

Optionally, the processing unit 410 is configured to:
in response to that the slice information includes a plurality of frequency points, search the plurality of frequency points or cells corresponding to the plurality of frequency points; and
in response to that a cell is found, determine the found cell as the target cell.

Optionally, the processing unit 410 is configured to:
in response to that the target cell is not determined according to the slice information, or that a suitable cell is not found on a frequency point included in the slice information, according to ranking of a signal strength of at least one cell on a first frequency point, sequentially search the at least one cell, wherein the first frequency point is one of at least one frequency point in a frequency band supported by the terminal device; and in response to that a cell is found and the found cell is a cell corresponding to slice supported or selected by the terminal device, determine the found cell as the target cell.

Optionally, the terminal device 400 includes a communication unit 420 configured to receive cell reselection priority information of RRC release information sent by a network device, wherein the cell reselection priority information includes the slice information.

Optionally, the processing unit 410 is configured to:
perform cell search according to priority information and the slice information in the cell reselection priority information; and
in response to that a cell is found, determine the found cell as the target cell.

Optionally, the processing unit 410 is configured to:
determine the target cell for cell reselection according to the slice information in system information for a camped cell.

Optionally, the terminal device 400 further includes a communication unit 420 configure to: receive a slicing-specific cell reselection parameter broadcast by a network device;
wherein the processing unit 410 is further configured to perform cell reselection according to a cell reselection parameter corresponding to the slice information.

Optionally, the cell reselection parameter is carried in at least one of:
SIB 2, SIB 3, SIB 4, SIB 5, at least one Information Element (IE) in SIB 2, at least one IE in SIB 3, at least one IE in SIB 4, and at least one IE in SIB 5.

Optionally, the terminal device is a terminal device that supports slicing or specific slicing, or the terminal device is a terminal device that selects specific slicing.

Optionally, the terminal device is in one of the following states:
an initial cell selection state, a cell reselection state, an any cell selection state, and a camped on any cell state.

Optionally, the terminal device is in an idle state or an inactive state.

Optionally, in some embodiments, the above-mentioned communication unit may be a communication interface or a transceiver, or an input/output interface of a communication chip or a system-on-chip. The aforementioned processing unit may be one or more processors.

It should be understood that the terminal device 400 according to the embodiments of the present application may correspond to the terminal device in the method embodiments of the present disclosure, and the above-mentioned and other operations and/or functions of the various units in the terminal device 400 are respectively for implementing corresponding processes of the terminal device in method 200 shown in FIG. 2, and repeated descriptions are omitted here for brevity.

Figure 8:
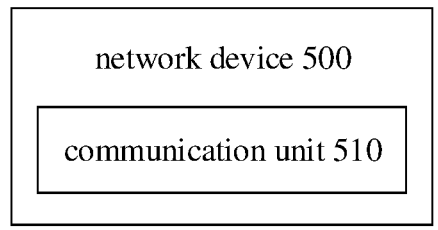
FIG. 8 is a schematic block diagram of a network device according to an embodiment of the present disclosure.

FIG. 8 is a schematic block diagram of a network device 500 according to an embodiment of the present disclosure. As shown in FIG. 8, the network device 500 includes a communication unit 510.

The communication unit 510 is configured to:
send first information to a terminal device, wherein the first information includes slice information, and the slice information is used for the terminal device to perform cell selection or reselection, or the slice information is used for the terminal device to determine a target cell for the cell selection or reselection, wherein the slice information includes at least one of:

a slice identity, Network Slice Selection Assistance Information (NSSAI), a slice type or a service type, a cell identity, a cell identity range, a frequency point index, a Public Land Mobile Network (PLMN), and a Tracking Area (TA) identity.

Optionally, the communication unit 510 is configured to:

send the first information to the terminal device by broadcasting, wherein the first information is system information.

Optionally, the slice information is carried in at least one of a Master Information Block (MIB), System Information Block (SIB) 1, SIB 2, SIB 3, SIB 4, and SIB 5 in the system information.

Optionally, the first information is dedicated Radio Resource Control (RRC) signaling.

Optionally, the first information further includes RRC release information.

Optionally, the first information is redirection information of RRC release information.

Optionally, the first information is cell reselection priority information of RRC release information.

Optionally, the communication unit 510 is further configured to:

send a slicing-specific cell reselection parameter to the terminal device by broadcasting, wherein the cell reselection parameter is used for the terminal device to perform cell reselection according to the cell reselection parameter corresponding to the slice information.

Optionally, the cell reselection parameter is carried in at least one of:

SIB 2, SIB 3, SIB 4, SIB 5, at least one Information Element (IE) in SIB 2, at least one IE in SIB 3, at least one IE in SIB 4, and at least one IE in SIB 5.

Optionally, the terminal device is a terminal device that supports slicing or specific slicing, or the terminal device is a terminal device that selects specific slicing.

Optionally, the terminal device is in one of the following states:

an initial cell selection state, a cell reselection state, an any cell selection state, a camped on any cell state.

Optionally, the terminal device is in an idle state or an inactive state.

Optionally, in some embodiments, the above-mentioned communication unit may be a communication interface or a transceiver, or an input/output interface of a communication chip or a system-on-chip.

It should be understood that the network device 500 according to the embodiments of the present application may correspond to the network device in the method embodiments of the present disclosure, and the above-mentioned and other operations and/or functions of the various units in the network device 500 are respectively for implementing corresponding processes of the network device in method 300 shown in FIG. 5, and repeated descriptions are omitted here for brevity.

Figure 9:
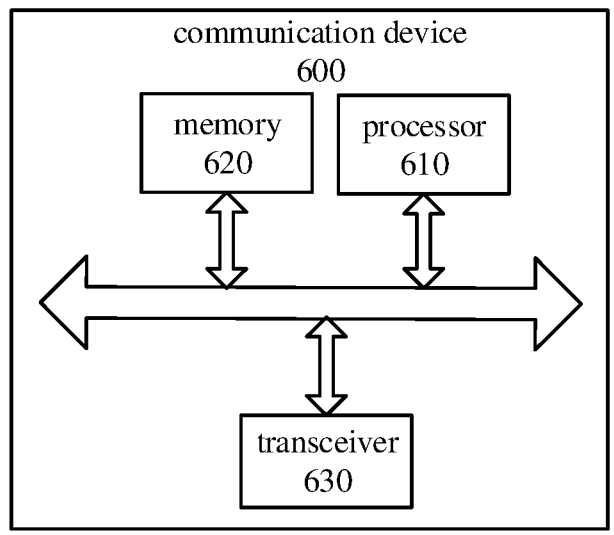
FIG. 9 is a schematic block diagram of a communication device according to an embodiment of the present disclosure.

FIG. 9 is a schematic structural diagram of a communication device 600 according to an embodiment of the present disclosure. The communication device 600 shown in FIG. 9 includes a processor 610, and the processor 610 may call and run a computer program from a memory to perform the method in embodiments of the present disclosure.

According to embodiments, as shown in FIG. 9, the communication device 600 may further include a memory 620. The processor 610 may call and run a computer program from the memory 620 to perform the method in embodiments of the present disclosure.

The memory 620 may be a separate device independent of the processor 610, or may be integrated in the processor 610.

According to embodiments, as shown in FIG. 9, the communication device 600 may further include a transceiver 630, and the processor 610 may control the transceiver 630 to communicate with other devices. Specifically, the transceiver may send information or data to other devices, or receive information or data sent by other devices.

The transceiver 630 may include a transmitter and a receiver. The transceiver 630 may further include one or more antennas.

According to embodiments, the communication device 600 may specifically be the network device according to an embodiment of the present disclosure, and the communication device 600 may implement the corresponding processes implemented by the network device in the method embodiments of the present disclosure.

According to embodiments, the communication device 600 may specifically be the mobile terminal/terminal device in embodiments of the present disclosure, and the communication device 600 may implement the corresponding processes implemented by the mobile terminal/terminal device in the method embodiments of the present disclosure. For brevity, details are not repeated here.

Figure 10:
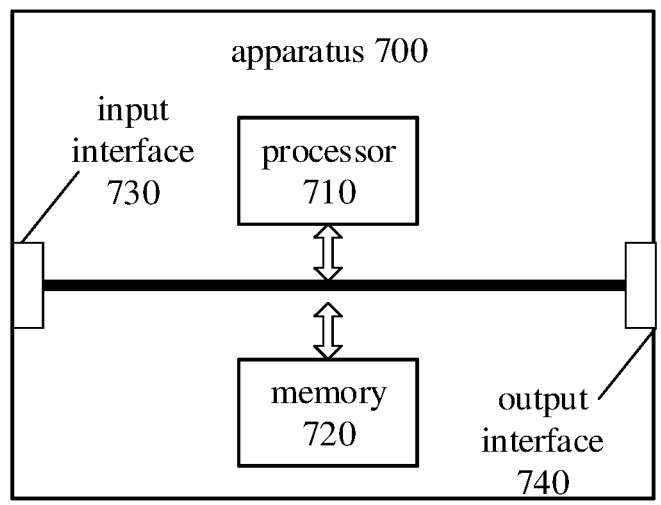
FIG. 10 is a schematic block diagram of an apparatus according to an embodiment of the present disclosure.

FIG. 10 is a schematic structural diagram of an apparatus 700 according to an embodiment of the present disclosure. The apparatus 700 shown in FIG. 10 includes a processor 710, and the processor 710 can call and run a computer program from a memory to implement the method according to embodiments of the present disclosure.

According to embodiments, as shown in FIG. 10, the apparatus 700 may further include a memory 720. The processor 710 may call and run a computer program from the memory 720 to implement the method according to embodiments of the present disclosure.

The memory 720 may be a separate device independent of the processor 710, or may be integrated in the processor 710.

According to embodiments, the apparatus 700 may further include an input interface 730. The processor 710 may control the input interface 730 to communicate with other devices or chips, and specifically, the processor 710 can control the input interface to obtain information or data sent by other devices or chips.

According to embodiments, the apparatus 700 may further include an output interface 740. The processor 710 can control the output interface 740 to communicate with other devices or chips, and specifically, the processor 710 can control the output interface 740 to output information or data to other devices or chips.

According to embodiments, the apparatus can be applied to the network device in embodiments of the present disclosure, and the apparatus can implement the corresponding processes implemented by the network device in various methods according to embodiments of the present disclosure. For brevity, details are not repeated herein again.

According to embodiments, the apparatus can be applied to the mobile terminal/terminal device in embodiments of the present disclosure, and the apparatus can implement the corresponding processes implemented by the mobile terminal/terminal device in various methods according to embodiments of the present disclosure. For brevity, details are not repeated herein again.

It should be understood that the apparatus in the embodiments of the present disclosure may also be a chip, for example, may be a system-level chip, a system chip, a chip system, or a system-on-chip, etc.

Figure 11:
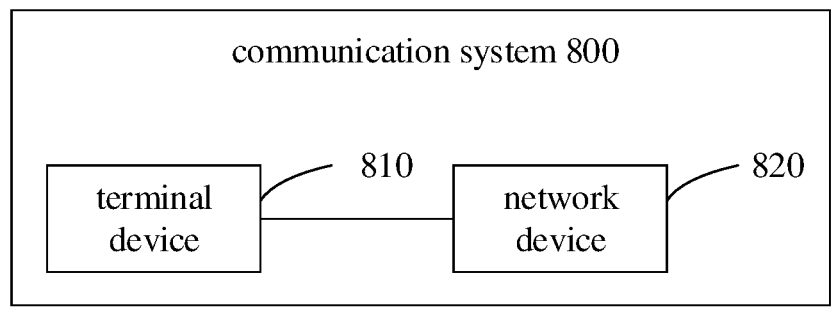
FIG. 11 is a schematic block diagram of a communication system according to an embodiment of the present disclosure.

FIG. 11 is a schematic block diagram of a communication system 800 according to an embodiment of the present disclosure. As shown in FIG. 11, the communication system 800 includes a terminal device 810 and a network device 820.

The terminal device 810 can be used to implement the corresponding functions implemented by the terminal device in the above method embodiments, and the network device 820 can be used to implement the corresponding functions implemented by the network device in the above method embodiments. For brevity, details are not repeated here.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

According to embodiments, the computer-readable storage medium may be applied to the mobile terminal/terminal device in embodiments of the present disclosure, and the computer programs cause a computer to perform the corresponding processes implemented by the mobile terminal/terminal device in each method embodiment of the present disclosure. For brevity, repeated descriptions are omitted here.

An embodiment of the present disclosure provides a computer program product, including computer program instructions.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

According to embodiments, the computer program product may be applied to the mobile terminal/terminal device in embodiments of the present disclosure, and the computer program instructions cause a computer to perform the corresponding processes implemented by the mobile terminal/terminal device in each method embodiment of the present disclosure. For brevity, repeated descriptions are omitted here.

An embodiment of the present disclosure also provides a computer program.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

According to embodiments, the computer program may be applied to the mobile terminal/terminal device in embodiments of the present disclosure, and when the computer program runs on a computer, the computer is caused to perform the corresponding processes implemented by the mobile terminal/terminal device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A wireless communication method, comprising:
   receiving, by a terminal device, cell reselection priority information of Radio Resource Control (RRC) release information sent by a network device, wherein the cell reselection priority information comprises priority information and slice information;
   determining, by the terminal device, a target cell for cell selection or reselection according to the priority information and the slice information;
   in response to the terminal device not determining the target cell which satisfies a cell reselection rule, in response to there being second slice information pre-stored by the terminal device, performing, by the terminal device, cell search according to the pre-stored second slice information;
   in response to there being multiple cells searched by the terminal device according to the second slice information pre-stored by the terminal device, determining, by the terminal device, a cell with the number of beams larger than a threshold among the multiple cells as the target cell;
   in response to no second slice information, which is slice information of a cell that the terminal device has accessed in the past and slice information of a cell that the terminal device has tried to access in the past, being pre-stored by the terminal device, performing, by the terminal device, cell reselection according to first slice information carried in system information of a cell which the terminal device currently camps on before a cell is determined according to the first slice information, wherein the first slice information comprises slice information corresponding to the cell which the terminal device currently camps on and information corresponding to a neighbor cell;
   wherein the slice information in the cell reselection priority information comprises at least one of:
   a slice identity, Network Slice Selection Assistance Information (NSSAI), a slice type or a service type, a cell identity, a cell identity range, a frequency point index, a Public Land Mobile Network (PLMN), or a Tracking Area (TA) identity.

2. The method according to claim 1, wherein determining, by the terminal device, the target cell for the cell selection or reselection according to the slice information comprises:
   performing, by the terminal device, cell search according to priority information and the slice information in the cell reselection priority information; and
   in response to that the terminal device finds a cell, determining, by the terminal device, the found cell as the target cell.

3. The method according to claim 1, wherein the terminal device is a terminal device that supports slicing or specific slicing, or the terminal device is a terminal device that selects specific slicing.

4. The method according to claim 1, wherein the terminal device is in one of the following states:
   an initial cell selection state, a cell reselection state, an any cell selection state, or a camped on any cell state.

5. The method according to claim 1, wherein the terminal device is in an idle state or an inactive state.

6. A wireless communication method, comprising:
   sending, by a network device, cell reselection priority information of Radio Resource Control (RRC) release information to a terminal device, wherein the cell reselection priority information comprises priority information and slice information, the priority information and slice information are used for the terminal device to determine a target cell for cell selection or reselection according to the priority information and the slice information; in response to the terminal device not determining the target cell which satisfies a cell reselection rule, in response to there being second slice information pre-stored by the terminal device, the terminal device performs cell search according to the pre-stored second slice information; in response to there being multiple cells searched by the terminal device according to the second slice information pre-stored by the terminal device, the terminal device determines a cell with the number of beams larger than a threshold among the multiple cells as the target cell;

in response to no second slice information, which is slice information of a cell that the terminal device has accessed in the past and slice information of a cell that the terminal device has tried to access in the past, being pre-stored by the terminal device, the terminal device performs a cell reselection according to first slice information carried in system information of a cell which the terminal device currently camps on before a cell is determined according to the first slice information, wherein the first slice information comprises slice information corresponding to the cell which the terminal device currently camps on and information corresponding to a neighbor cell;

wherein the slice information in the cell reselection priority information comprises at least one of:

a slice identity, Network Slice Selection Assistance Information (NSSAI), a slice type or a service type, a cell identity, a cell identity range, a frequency point index, a Public Land Mobile Network (PLMN), or a Tracking Area (TA) identity.

7. A terminal device, comprising a processor, a transceiver, memory and instructions stored in the memory that, when executed by the processor, cause the terminal device to:

receive cell reselection priority information of Radio Resource Control (RRC) release information sent by a network device, wherein the cell reselection priority information comprises priority information and slice information;

determine a target cell for cell selection or reselection according to the priority information and the slice information;

in response to the terminal device not determining the target cell which satisfies a cell reselection rule, in response to there being second slice information pre-stored by the terminal device, perform cell search according to the pre-stored second slice information;

in response to there being multiple cells searched by the terminal device according to the second slice information pre-stored by the terminal device, determine a cell with the number of beams larger than a threshold among the multiple cells as the target cell;

in response to no second slice information, which is slice information of a cell that the terminal device has accessed in the past and slice information of a cell that the terminal device has tried to access in the past, being pre-stored by the terminal device, perform cell reselection according to first slice information carried in system information of a cell which the terminal device currently camps on before a cell is determined according to the first slice information, wherein the first slice information comprises slice information corresponding to the cell which the terminal device currently camps on and information corresponding to a neighbor cell, wherein the slice information in the cell reselection priority information comprises at least one of:

a slice identity, Network Slice Selection Assistance Information (NSSAI), a slice type or a service type, a cell identity, a cell identity range, a frequency point index, a Public Land Mobile Network (PLMN), or a Tracking Area (TA) identity.

\* \* \* \* \*